US012311982B2

(12) United States Patent
David et al.

(10) Patent No.: US 12,311,982 B2
(45) Date of Patent: May 27, 2025

(54) SYSTEMS AND METHODS FOR DISPLAYING TRAJECTORIES FOR AUTONOMOUS VEHICLES

(71) Applicant: Toyota Motor Engineering & Manufacturing North America, Inc., Plano, TX (US)

(72) Inventors: Mikio David, Ypsilanti, MI (US); John C. Rafferty, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 217 days.

(21) Appl. No.: 17/339,458

(22) Filed: Jun. 4, 2021

(65) Prior Publication Data
US 2022/0388543 A1 Dec. 8, 2022

(51) Int. Cl.
*B60W 60/00* (2020.01)
*B60K 35/00* (2006.01)
(Continued)

(52) U.S. Cl.
CPC ......... *B60W 60/0051* (2020.02); *B60K 35/00* (2013.01); *G05B 19/042* (2013.01); *G06V 20/58* (2022.01); *B60K 35/23* (2024.01); *B60K 35/28* (2024.01); *B60K 2360/166* (2024.01); *B60K 2360/177* (2024.01); *B60W 2420/403* (2013.01);
(Continued)

(58) Field of Classification Search
CPC ....... B60W 60/0051; B60W 2540/221; B60W 2420/42; B60W 2420/54; B60W 2540/18; G06V 20/58; G06V 20/59; B60K 35/00; B60K 2370/1529; B60K 2370/177;
(Continued)

(56) References Cited

U.S. PATENT DOCUMENTS 10,083,547 B1 9/2018 Tomatsu
10,395,433 B2 8/2019 Tomatsu
(Continued)

FOREIGN PATENT DOCUMENTS

CN 212125098 U 12/2020
CN 112455449 A 3/2021
(Continued)

OTHER PUBLICATIONS

K. Akash, Wan-Lin Hu, T. Reid and N. Jain, "Dynamic modeling of trust in human-machine interactions," 2017 American Control Conference (ACC), Seattle, WA, USA, 2017, pp. 1542-1548 (Year: 2017).*
(Continued)

*Primary Examiner* — Russell Frejd
*Assistant Examiner* — Brittany Renee Peko
(74) *Attorney, Agent, or Firm* — Dinsmore & Shohl LLP (57) ABSTRACT

A vehicle includes a computing device configured to detect an object in an external environment via an external sensor. The computing device determines a trajectory for navigation relative the object based on a trust zone. The trust zone is selected based on a trust parameter. The computing device instructs a display device to render a representation of the object and the trajectory relative the object, and determines whether to modify the trust parameter based on feedback data received in response to navigation.

13 Claims, 4 Drawing Sheets

(51) Int. Cl.
| | |
|---|---|
| *G05B 19/042* | (2006.01) |
| *G06V 20/58* | (2022.01) |
| *B60K 35/23* | (2024.01) |
| *B60K 35/28* | (2024.01) |
| *G05D 1/00* | (2006.01) |
| *G06V 20/59* | (2022.01) |
| *G10L 25/63* | (2013.01) |

(52) U.S. Cl.
CPC ..... *B60W 2420/54* (2013.01); *B60W 2540/18* (2013.01); *B60W 2540/221* (2020.02); *G05B 2219/2637* (2013.01); *G05D 1/0214* (2013.01); *G06V 20/59* (2022.01); *G10L 25/63* (2013.01)

(58) Field of Classification Search
CPC ............ B60K 2370/166; G05B 19/042; G05B 2219/2637; G05D 1/0214; G10L 25/63
See application file for complete search history.

(56) References Cited

U.S. PATENT DOCUMENTS

| | | | | |
|---|---|---|---|---|
| 2013/0187771 | A1* | 7/2013 | Rothschild | B60Q 1/00 340/435 |
| 2017/0276494 | A1 | 9/2017 | Kusano et al. | |
| 2019/0049957 | A1* | 2/2019 | Healey | G05D 1/0066 |
| 2020/0247429 | A1* | 8/2020 | Tram | B60W 50/085 |
| 2020/0250969 | A1 | 8/2020 | Wang et al. | |
| 2020/0331459 | A1* | 10/2020 | Szczerba | B60W 30/025 |
| 2020/0331481 | A1* | 10/2020 | Szczerba | B60W 50/0098 |
| 2021/0078608 | A1* | 3/2021 | Misu | B60W 60/0059 |
| 2021/0276567 | A1* | 9/2021 | Othersen | B60W 40/08 |
| 2022/0281461 | A1* | 9/2022 | Gentner | B60W 40/08 |
| 2022/0324490 | A1* | 10/2022 | Akash | B60W 60/0059 |
| 2023/0219586 | A1* | 7/2023 | Giersch | B60W 50/085 |

FOREIGN PATENT DOCUMENTS

| | | |
|---|---|---|
| DE | 102017221191 A1 | 5/2019 |
| DE | 102018203121 A1 | 9/2019 |

OTHER PUBLICATIONS

Augmented Reality Head-Up Displays Point the Way Toward Self-Driving (https://www.forbes.com/sites/dougnewcomb/2015/10/15/augmented-reality-head-up-displays-point-the-way-toward-self-driving/?sh=2998cac27c25) Oct. 15, 2015.

Here Are the Benefits to Digitally Developing AR HUD (https://www.ansys.com/en-in/blog/digitally-developing-ar-hud) Feb. 14, 2020.

* cited by examiner

SYSTEMS AND METHODS FOR DISPLAYING TRAJECTORIES FOR AUTONOMOUS VEHICLES

TECHNICAL FIELD

The present specification generally relates to displaying information on display devices of vehicles and, more specifically, the present disclosure provides systems and methods for displaying trajectories around objects according to a trust setting for autonomous vehicles.

BACKGROUND

In autonomous or semi-autonomous vehicles, a plurality of sensors equipped with the autonomous vehicle may take measurements to gather information corresponding to the environment through which the autonomous vehicle is navigating in order to safely autonomously operate the autonomous vehicle.

Passengers of an autonomous vehicle that do not have much experience in riding in an autonomous vehicle may be uneasy because they do not understand the vehicle's capabilities. In such instances, drivers may provide their attention to the roadway and unnecessarily intervene in the operation of their autonomous vehicles using their knowledge of the current traffic situation.

Accordingly, there is a need for systems and methods that increase passenger trust in autonomous vehicles, identify the capabilities of autonomous vehicles, and otherwise improve upon autonomous vehicles.

SUMMARY

In one embodiment, a vehicle includes a computing device configured to detect an object in an external environment via at least one external sensor. The computing devices is further configured to determine a trajectory for navigation relative the object based on a trust zone selected from a plurality of trust zones, wherein the trust zone is selected based on a trust parameter. The computing devices can instruct a display device to render a representation of the object and the trajectory relative the object, and determine whether to modify the trust parameter based on feedback data received in response to navigation.

In one embodiment, a method implemented by a vehicle includes analyzing external sensor data to identify an object. The method further includes, determining a trajectory for navigation relative to the object based on a trust zone, wherein the trust zone is selected based on a trust parameter, displaying a representation of the object and the trajectory relative the object, and determining whether to modify the trust parameter based on feedback collected in response to navigation.

In another embodiment, a vehicle navigation system includes an electronic control unit configured to detect objects in an external environment via at least one external sensor. The electronic control unit is further configured to determine a trajectory for navigation relative the object based a trust zone selected from a plurality of trust zones, wherein the trust zone is selected based on a trust parameter stored in a computer readable memory. The electronic control unit can instruct a display device to render a representation of the object and the trajectory relative the object. Moreover, the electronic control unit can modify the trust parameter in response to comparison of feedback data to a trust model.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for determining and displaying trajectories for an autonomous or semi-autonomous vehicle based on trust parameters associated with a user. Embodiments include a computing device or an electronic control unit of a vehicle configured to identify objects in an external environment to a vehicle, such as on a roadway or parking lot. Autonomous vehicles can be aware of the environment through which the autonomous vehicle is navigating via a plurality of sensors equipped with the autonomous vehicles. The computing device can determine trajectories for navigation of the vehicle based on information from the plurality of sensors and based on a trust parameter associated with the user. The computing device further displays, via a display device such as an augmented reality heads up display ("AR HUD"), the trajectory.

Users can gain an increased trust level regarding the vehicle's autonomous control by viewing the trajectory planned by the vehicle's autonomous control. For example, an AR HUD displays information to show the passengers that the vehicle is properly detecting objects in the environment and can take the necessary steps to navigate the environment. In some examples, the computing device determines whether to adjust the trust parameter based on feedback data. Moreover, trust zones are displayed around the objects to indicate when the vehicle is getting close to the objects, trajectories, or other information. Further, a vehicle may have a trust setting defining a driving style, such as conservative or non-conservative. The trust parameter may be adjusted for or by a passenger as a user setting.

Figure 1:
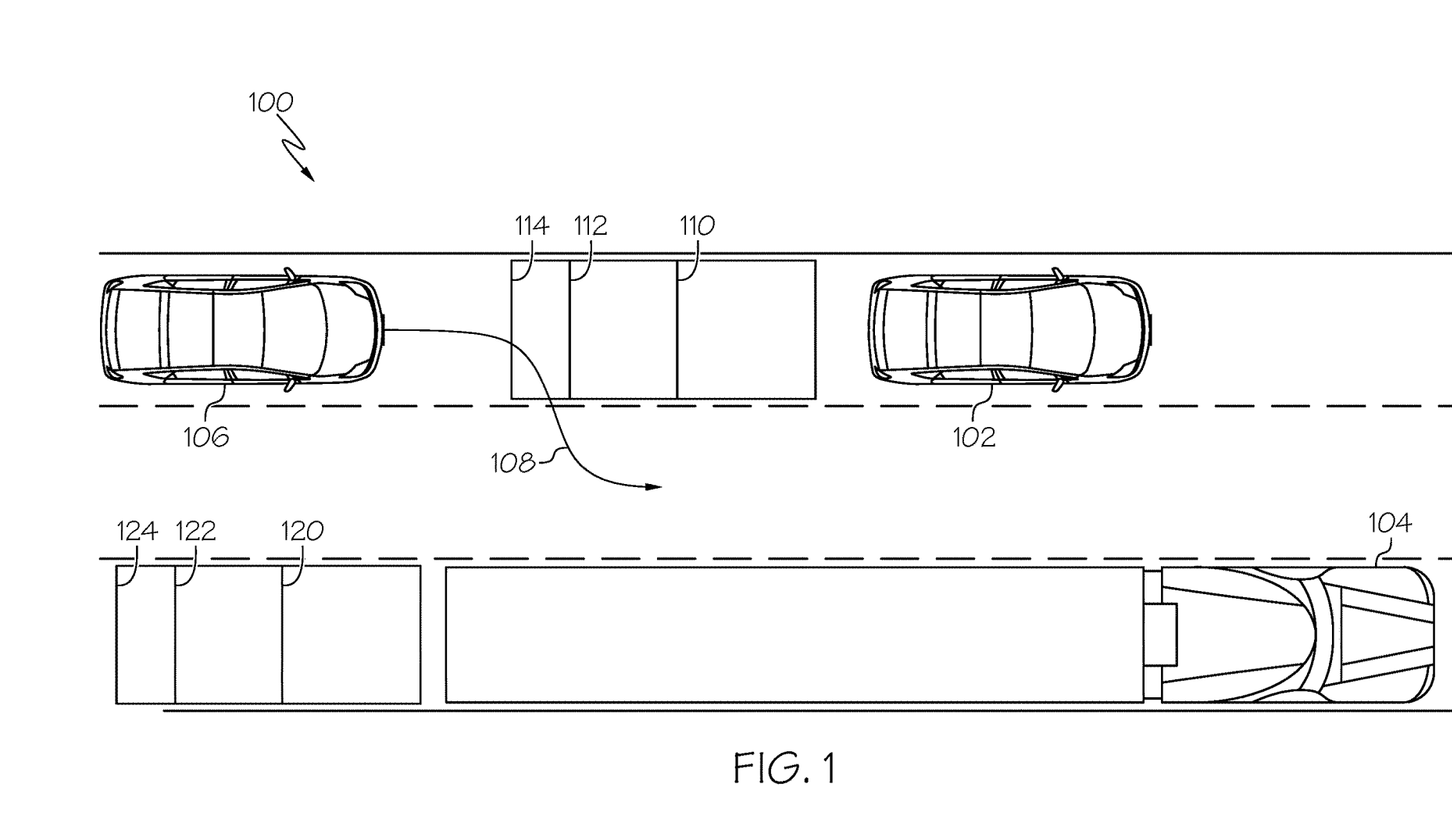
FIG. 1 depicts an illustrative embodiment of an operating environment for a vehicle navigation system including vehicles and trust zones according to one or more embodiments shown and described herein.

Turning now to the drawings, where like numbers refer to like structures, and particularly to FIG. 1, an illustrative embodiment of an environment 100 for a vehicle 106 traveling along a roadway, including a first object 102 (such as a vehicle) and a second object 104 (such as a tractor trailer or semi-truck), is depicted. However, this is merely an example. In some environments 100, the vehicle 106 may be traveling in a parking garage, parking lot, or other appropriate locations.

In embodiments, the vehicle 106 can be navigating along the roadway in an autonomous mode, wherein the vehicle 106 is capable of navigation without a user controlling a steering wheel and/or vehicle speeds. The vehicle 106 can approach object 102 and can either maintain a distance away from the object 102 or navigate around the object 102. It is noted that the vehicle 106 may, alternatively, approach object 104 from a rear, in which case the vehicle 106 can maintain a distance away from the object 104 or navigate around the object 104. The objects may comprise any type of appropriate objects, such as other vehicles, construction barrels or markers, signs, pedestrians, structures (e.g., parking structures, walls, etc.), barriers, or the like. Moreover, any number of appropriate objects may be located in the environment 100.

Figure 2:
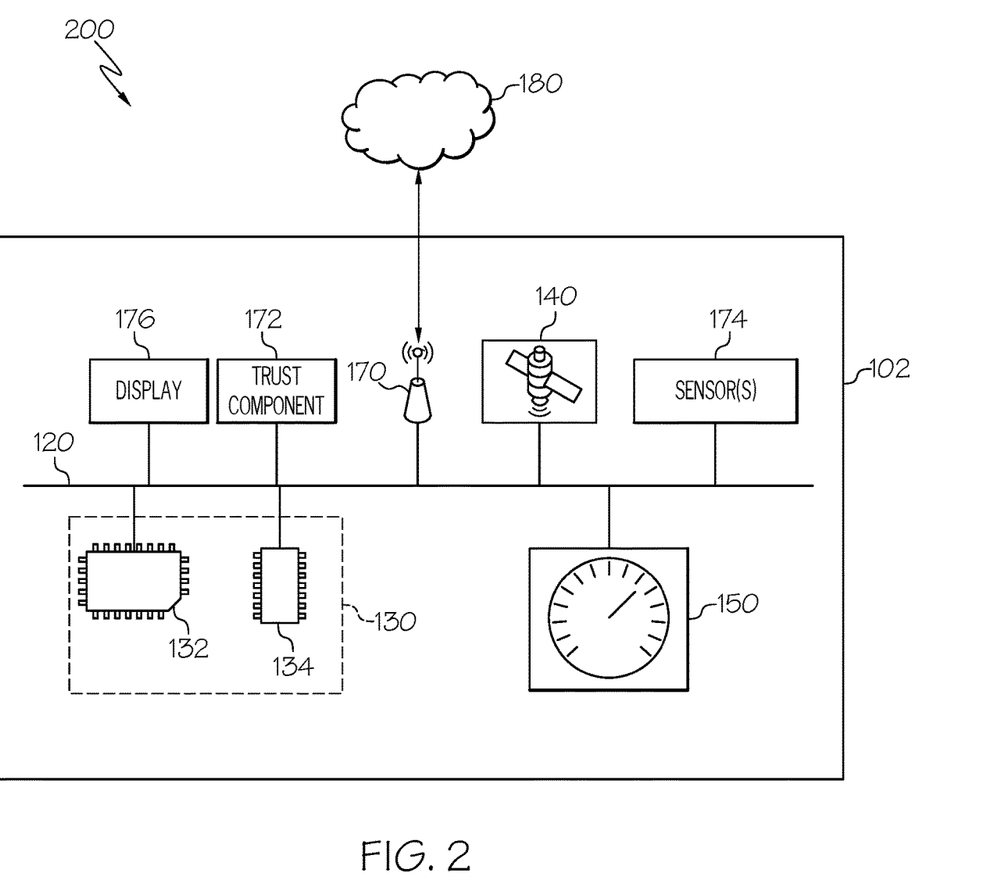
FIG. 2 schematically depicts components of a vehicle according to one or more embodiments shown and described herein.

The vehicle 106 can detect the objects 102, 104 in the environment 100 via at least one external sensor (e.g., sensor(s) 174 of FIG. 2). The vehicle 106 can determine a trajectory 108 for navigation or maneuvering relative the object 102 and/or object 104. The trajectory 108 can be determined based on a trust zone, such as trust zones 110, 112, 114 for object 102, and/or trust zones 120, 122, or 124 for object 104. The trust zones 110, 112, 114 and/or trust zones 120, 122, or 124 can define predetermine distances at which the vehicle 106 should maintain from the object 102 and/or 104. Selection of a trust zone 110, 112, 114 and/or trust zone 120, 122, or 124 can be based on a trust parameter associated with the user (e.g., one or more of a passenger, driver, etc.)

According to embodiments, a trust parameter can include a trust level or trust setting. The trust parameter can be stored in local memory of vehicle 106 (non-transitory computer readable memory 134 of FIG. 2) or in another computing device, such as a user's smart phone, wearable electronic device, a server computer, or the like. The trust level may be a scaled level, such as low, medium, and high trust levels. Such levels may be represented by tokens (e.g., stars), numbers (e.g., 1 out of 3), alphanumerical labels, or the like. In an example, a high trust level indicates that the user has a greater level of trust in the autonomous navigation of the vehicle 106 and a lower level of trust indicates that the user has a lower level of trust in the autonomous navigation of the vehicle 106.

It is noted that trust parameters may very among users and among different environmental conditions associated with the same user. In some examples, the user may provide input identifying specific trust levels for given situations or a global trust level. For instance, a single user may have different comfort or trust levels if the vehicle 106 is trailing a car (e.g., object 102) as opposed to a semi-truck (e.g., object 104). In yet another example, a single user may have comfort or trust levels if the vehicle 106 is traveling in a high traffic area in an urban location, than if the vehicle is traveling in a rural area with low traffic. Accordingly, the vehicle 106 can determine or calculate a trust level for a vehicle based on environmental conditions.

Environmental conditions can include conditions that may be measured, input, or otherwise determined. Such conditions may include vehicle information related to other vehicles in the environment 100. Such information may include classification of a vehicle (e.g., a car, sport utility vehicle, semi-truck, motor cycle, construction vehicle, dump truck, trailer, autonomous vehicle, etc.), whether other vehicles are connected via a vehicle to vehicle network, a condition of a vehicle (e.g., clean, dirty, snow covered, rusty, etc.), make and model of a vehicle, or the like. Other environmental conditions may include types of objects (e.g., structure, pedestrian, bicycle, or the like), age of pedestrians, weather conditions, speed of a the vehicle 106 or other vehicles/objects, a type of roadway or other operating environment, time of day, time of year, level of ambient light, whether the environment has artificial lights on (e.g., roadway lights, parking garage lights), persons within the vehicle 106, number of passengers within the vehicle 106, a location, traffic conditions (e.g., light traffic, traffic jam, etc.), or other conditions.

In some embodiments, a trust level may be determined based on artificial intelligence, statistical models, or other processes and/or algorithms to determine or adjust trust levels for a given scenario (e.g., determine factors to modify a trust level, etc.). For instance, the vehicle 106 may calculate trust levels by applying a weighted model. The weighted model may weigh or balance various relationally applied factors, where weighting and balancing may vary in accordance with machine learning over time. In an example, factors may be applied to determine priority, wherein certain factors are weighted more heavily than other factors in a given services request. The factors may include various conditions identified herein. Embodiments may utilize different or other factors according to a weighted model. For instance, classifiers may be mapped to an attribute vector to a confidence that the attribute belongs to a class. An input attribute vector, $x=(x1, x2, x3, x4, xn)$ may be mapped to $f(x)=$confidence(class). Such classification can employ a probabilistic and/or statistical based analysis to infer a probability of a trust level. The vehicle 106 may determine whether to assign a trust level based on the probability exceeding a probability threshold (e.g., a percentage, a number of tokens out of possible tokens, etc.). In various embodiments, the vehicle 106 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that the vehicle 106 may utilize to develop trust level models.

The vehicle 106 can select a trust zone for determining the trajectory 108 for navigation relative the object 102 and/or 104, based on the trust parameter. For instance, the trust zone may be selected from trust zones 110, 112, 114 for object 102, and/or trust zones 120, 122, or 124 for object 104 according to the user's level of trust with autonomous navigation relative the object 102 and/or 104. In an example, in response to a trust level being relatively high, the vehicle 106 can select a trust zone to be closer to the object, such as trust zone 110 for object 102. In response to the trust level being relatively low, the vehicle 106 can select a trust zone to be further from the object, such as trust zone 114 for object 102. If the trust level is in the middle (e.g., not the highest or lowest possible trust levels), the vehicle can select an intermediary trust zone, such as trust zone 112 for object 102. It is noted that any number of different trust zones may be utilized.

The vehicle 106, when in an autonomous mode, may navigate or otherwise maneuver according to the trajectory 108. As the vehicle 106 navigates along the trajectory 108, the vehicle 106 may monitor for feedback data. The vehicle 106 may utilize the feedback data to modify a trust level, such as by applying the feedback data to a trust level model. Feedback data may include data collected from one or more sensors (e.g., sensors 174 of FIG. 2). The feedback data can include, for example, audio from a user. If a user gasps, makes an excited utterance, or makes other sounds indicative of the user being nervous, the vehicle 106 may apply captured audio to audio recognition algorithm, which may include or be included into the trust level model. In other examples, feedback data can include other information indicative of a user being nervous or otherwise not having a high level of trust in autonomous navigation, such whether a user grabs a steering wheel, switches to non-autonomous mode, perspires, increases breathing rate, increases heart rate, has rapid eye movement, or the like. As described herein, information may be collected or recorded from sensors within the vehicle (e.g., sensors 174 of FIG. 2), sensors attached to a user (e.g., wearable electronic devices), imaging devices (e.g., dash cameras), or the like.

Turning now to FIG. 2, with reference to FIG. 1, an example schematic of a portion of the vehicle 106 including sensor resources and a computing device is depicted. It is noted that other vehicles within the environment 100 may be equipped with the same, similar, or different sets of sensor resources, telematics resources, or the like. In at least some embodiments, the vehicle 106 may include a computing device and/or an electronic control unit 130 comprising a processor 132 and a non-transitory computer readable memory 134, a navigation unit 140 (e.g., global positioning system (GPS), compass, etc.), a vehicle sensor(s) 174 (e.g., vehicle speed sensors, motion sensors, proximity sensors, etc.), a display 176, a trust component 172, and a communications unit 170. These and other components of the vehicle 106 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 106 by the communication bus 120. Accordingly, the communication bus 120 may communicatively couple any number of processors 132 with one another, and allow the components coupled to the communication bus 120 to operate in a distributed computing environment. It is further noted that the processor 132 may comprise a single processor, multiple processors, or a system of processors.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 134 may include one or more devices, memory modules, or the like.

Still referring to FIG. 2, a navigation unit 140 such as a GPS device, electronic compass, or the like may be coupled to the communication bus 120 and communicatively coupled to the electronic control unit 130 of the vehicle 106. The navigation unit 140 is capable of generating location information and/or heading information indicative of a location of the vehicle 106 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The vehicle 106 may also include sensor(s) 174 coupled to the communication bus 120 and communicatively coupled to the electronic control unit 130. The sensor(s) 174 may include external or vehicle sensors, which may be any sensor or system of sensors, which may include sensors for operating an autonomous vehicle. In examples, sensor(s) 174 may be configured for generating a signal indicative of vehicle speed, movement, proximity to other vehicles, etc. For example, without limitation, a vehicle sensor(s) 174 may be a tachometer that is capable of generating a signal indicative of a rotation speed of a shaft of the vehicle 106 engine or a drive shaft. Signals generated by the vehicle sensor(s) 174 may be communicated to the electronic control unit 130 and converted to a vehicle speed value. The vehicle speed value is indicative of the speed of the vehicle 106. In some embodiments, the vehicle sensor(s) 174 comprises an opto-isolator slotted disk sensor, a Hall Effect sensor, a Doppler radar, or the like. In some embodiments, a vehicle sensor(s) 174 may comprise data from a GPS for determining the speed of the vehicle 106. The vehicle sensor(s) 174 may be provided so that the electronic control unit 130 may determine when the vehicle 106 accelerates, maintains a constant speed, slows down or comes to a stop. For example, a vehicle sensor(s) 174 may provide signals to the electronic control unit 130 indicative of vehicle 106 slowing down due to a change in traffic conditions or prior to the vehicle performing a turning maneuver.

According to embodiments, the electronic control unit 130 may receive feedback data from the vehicle sensors 174. In embodiments, sensor(s) 174 may include internal sensors, which may be any sensor or system of sensors configured to monitor internal conditions of a vehicle, conditions of a vehicle cabin, user actions or responses, or the like. In examples, internal sensors can include audio sensors, video sensors, pressure sensors, temperature sensors, biometric sensors, or other appropriate sensors. The internal sensors can be coupled to the coupled to the communication bus 120 and communicatively coupled to the electronic control unit 130. The electronic control unit 130 may utilize the feedback data to estimate or otherwise determine a user's trust or comfort level with autonomous driving. Moreover, the electronic control unit 130 may apply feedback data to a model, may train a model with feedback data, or the like.

The vehicle sensors 174 may include one or more pressure sensors that can measure pressure on a steering wheel, a gear shifter, a floor, a pedal, a door handle, or other component of the vehicle 106. If the pressure sensor indicates that the user applied pressure during navigation, this may indicate that the user lacked trust during navigation through the trajectory 108, or at other times during navigation. The electronic control unit 130 may modify the trust level based on the feedback data to reflect that a user does not have high trust in the vehicle 106 during navigation in the trust zone, relative given traffic situations. In another example, the vehicle sensors 174 may include one or more image sensor configured to identify images of a user, ambient light, or the like. The image sensors can monitor images of the user to identify indications of stress, which may be identified through image analysis. Moreover, sensors 174 can include one or more biometric sensors configured to measure biometric information associated with a user. Biometric sensors can include breathing sensors, blood pressure sensors, hear rate sensors, perspiration sensors, eye movement sensors, or other biometric sensors. Biometric sensors can be included in components of vehicles (e.g., seat belts, steering wheels, etc.) or in wearable devices, such as smart watches or fitness trackers.

Still referring to FIG. 2, the non-transitory computer readable memory 134 may include or be in communication with a trust component 172. The trust component 172 may include computer readable instructions (e.g., trust component logic) that, when executed by the processor 132, cause the processor 132 to provide functions of the trust component 172 described herein. It is further noted that the trust component 172 may be implemented within or comprised by one or more devices (e.g., one or more electronic control units), remote devices (e.g., servers, remote computing devices), or the like. While embodiments may refer to a vehicle as comprising the trust component 172, it is noted that servers, remote computing devices, or the like may comprise the trust component 172.

The trust component 172 may be configured to determine trust parameters, such as trust levels, for a user. The trust parameters may include factors which may be determined as altering a user's trust level in a given situation, such as whether nearby vehicles are cars, semi-trucks, or the like. Moreover, the trust component 172 can monitor trust parameters, determine whether to modify trust parameters, and may modify trust parameters. In examples, the trust component 172 may monitor and receive feedback data, such as data from sensors 174 or data from user interfaces, to determine a user's trust in autonomous navigation during certain situations. In embodiments, the trust component 172 may train a model to determine a user's trust level in a traffic situation and/or environment during maneuvering.

With reference to FIG. 1, the trust component 172 may receive input from sensors indicating that object 102 comprises a sedan and object 104 comprises a semi-truck. The user may have an aversion to traveling in the trajectory 108 where the vehicle 106 maneuvers to a lane adjacent to a semi-truck. Accordingly, the trust component 172 may receive feedback data from a user during or prior to a planned maneuvering according to the trajectory 108. For example, the trust component 172 may instruct the display 176 to display the trajectory. The user may provide feedback through an interface (e.g., button, microphone configured to receive a voice command, etc.) to identify the user's comfort level. In other examples, the trust component 172 can identify indications of a user's trust level, such as through a user's breathing rate, heart rate, whether the user began manual control, or other information measured by sensors 174.

The display 176 can represent one or more displays of the system 100. The display 176 can be one or more of a HUD, a three-dimensional HUD device a hologram projection system, a liquid crystal display (LCD), a light emitting diode (LED) display, and the like. The display 176 can display trajectories, detected objects, information about detected objects (e.g., types or classifications, trajectories of objects, etc.), a direction of potential danger, or other information to a user. The display 176 can be placed in a predetermined location, project images in a predetermined location, or the like. The predetermined location can correspond a dashboard, a windshield, a headset, or in other appropriate locations. Moreover, the display 176 can comprise an augmented reality display device, such as a three-dimensional heads-up display device.

The electronic control unit 130 may instruct the display 176 to render images, such as graphical representations of environment 100. In examples, the electronic control unit 130 may identify detected objects on the display 176 via graphical images, photographs, alphanumerical labels, tokens, or the like. For instance, the electronic control unit 130 may instruct the display 176 to render a graphical representation of environment 100 with alphanumerical labels imposed on objects. The alphanumerical labels may identify information detected by the vehicle 106, such as classifications of objects, expected trajectories of objects, whether other vehicles are in an autonomous mode, trust zones associated with the objects, weather conditions, lighting conditions, or the like. Labeling of the graphical representation of the environment 100 may further allow the vehicle 106 to communicate information available to the vehicle 106 which a user may not be aware of. This may further improve a user's trust in the ability of the vehicle 106 to navigate in an autonomous mode. For instance, identification of object classifications may allow users to see that the vehicle 106 is capable of recognizing and distinguishing objects.

Figure 3:
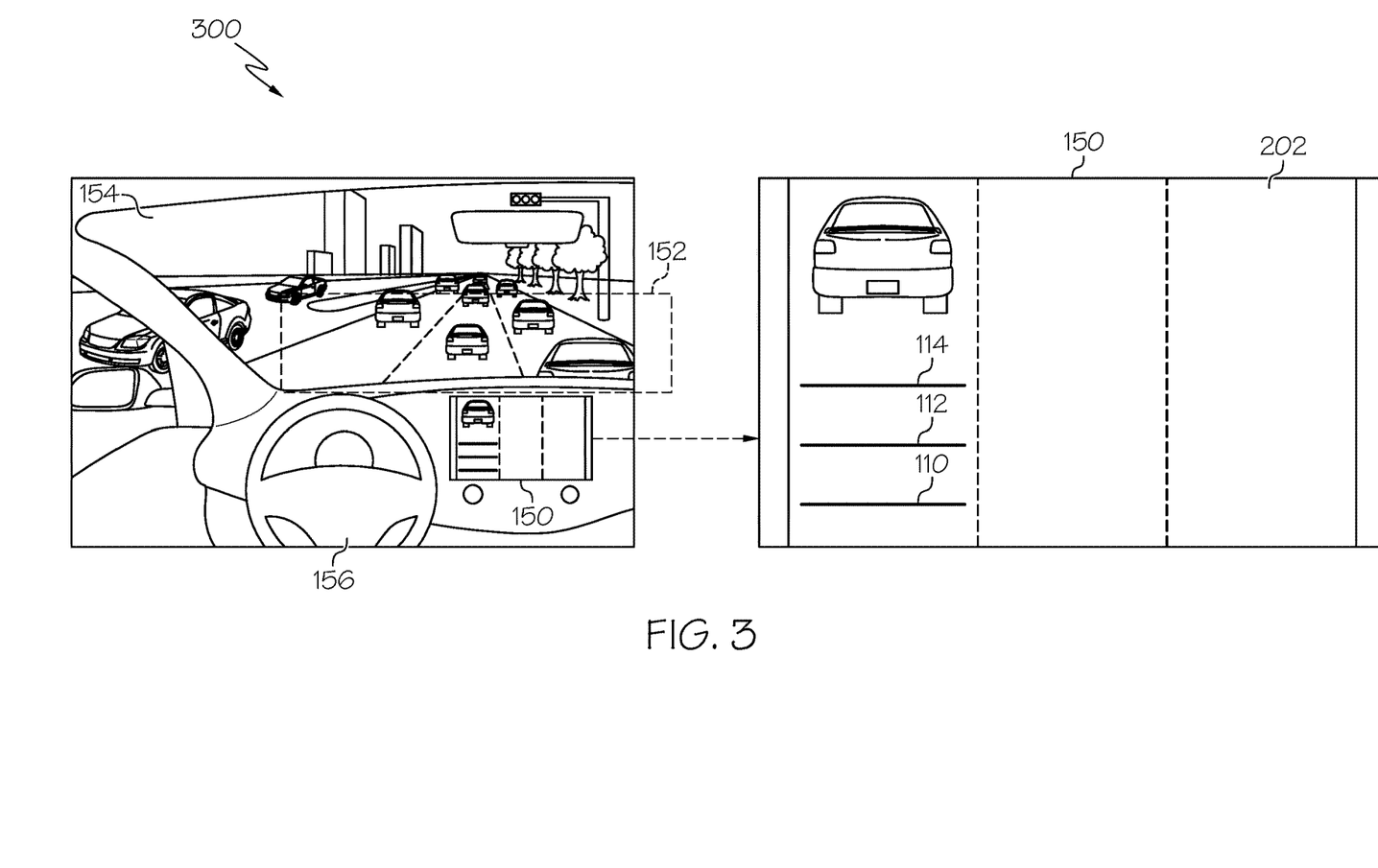
FIG. 3 depicts an illustrative embodiment of a vehicle navigation system for determining and displaying vehicle trajectories according to one or more embodiments shown and described herein.

Referring now to FIG. 3 with reference to FIGS. 1 and 2, an illustrative embodiment of a vehicle navigation system 300 for determining and displaying vehicle trajectories according to one or more embodiments is shown and described. The vehicle 106 can include a windshield 154, steering wheel 156, and a display 150 within a cabin of the vehicle 106. The display 150 may comprise or may be a portion of the display 176 of FIG. 2.

In embodiments, the display 150 may comprises a display screen that may render a graphical representation 202 of environment 100. The display 150 may render trust zones 110, 112, 114 on the graphical representation 202. If the vehicle 106 navigates behind object 102, the display 150 may determine stopping distances according to the trust zones 110, 112, 114 and trust parameters, such as user trust levels. In other examples, the display 150 may identify vehicle types and provide information to the user. It is further noted that the windshield 154 may receive information from or comprise a display device of display 176 of FIG. 2. For instance, a portion 152 of the windshield 154 may be configured to receive projected images.

Figure 4:
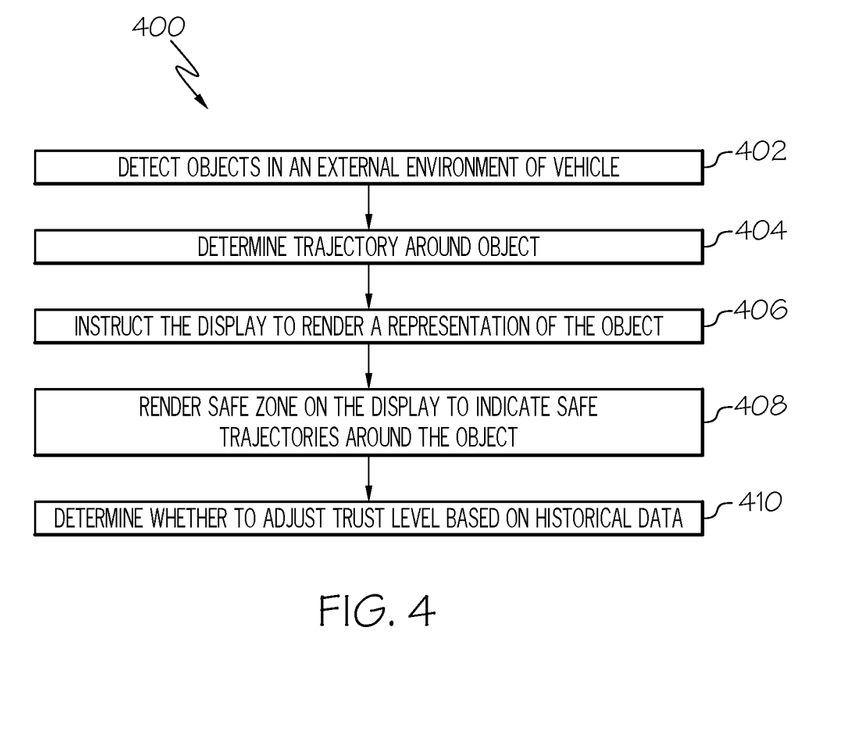
FIG. 4 depicts a flowchart of an example method for determining and displaying vehicle trajectories according to one or more embodiments shown and described herein.

In view of the subject matter described herein, methods that may be related to various embodiments may also be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a vehicle or components thereof, such as the computing device and/or an electronic control unit 130 (e.g., FIG. 2), or the like.

FIG. 4 depicts a flowchart 400 of an example method for determining and displaying vehicle trajectories according to one or more embodiments shown and described herein. The following method is described with reference to the components depicted and described in FIGS. 1-3. The method for determining and displaying vehicle trajectories may be implemented by computing device or an electronic control unit 130 of the vehicle 106. For purposes of explanation, process blocks will be described as being implemented by the vehicle 106. Furthermore, while the method is described with respect to vehicle 106, any number of vehicles may utilize the method.

At block 402, the vehicle 106 can detect objects in an external environment of the vehicle, such as environment 100. The vehicle 106 can utilize sensors 174, communications from other vehicles, or the like to identify and locate objects. In examples, the vehicle 106 can analyze external sensor data to identify an object, determine classifications of types of objects, and determine information describing the object's behavior. For instance, the vehicle 106 can utilize data from sensors 174 to identify a type of a vehicle, such as a car, sport utility vehicle, semi-truck, motor cycle, construction vehicle, dump truck, trailer, autonomous vehicle, a make/model of vehicle, or the like. Further, the vehicle 106 can utilize data from sensors 174 to identify whether other vehicles are connected via a vehicle to vehicle network, a condition of a vehicle (e.g., clean, dirty, snow covered, rusty, etc.), or the like.

The vehicle 106 may identify other objects in the environment 100, such as structure, pedestrian, bicycle, or the like. Types of objects can be identified and/or data about objects can be determined, such as age of pedestrians, speed of objects, trajectories of objects, materials (e.g., brick, metal, etc.).

At block 404, the vehicle 106 may determine a trajectory around the object. Determining the trajectory can include identifying a trajectory for navigation relative to the object based on a trust zone. The trust zone is selected based on a trust parameter. The trajectory can include navigating around an object, stopping relative an object, or the like. The vehicle 106 can determine the trajectories based on a trust zone selected for a user's trust parameter in a given environment. Trust zones can be selected based on trust levels, where trust zones can be closer to the object when the trust parameter comprises the high level of trust and selects the trust zone to be further from the object when the trust parameter comprises the low level of trust. For instance, a user may have a high level of trust while a vehicle is in a particular parking garage or parking space, such that the vehicle 106 may select trust zones that place the vehicle 106 closer to objects.

At block 406, the vehicle 106 can instruct a display to render a representation of the object. The representation can be a graphical representation. The graphical representation can include captured images, computer generated images, or the like. It is further noted that the vehicle 106 can instruct the display to render labels identifying the object, identifying information associated with the object (e.g., distance from vehicle 106, object speed, type of object, etc.).

At block 408, the vehicle 106 can render a trust zone on the display to indicate safe trajectories around the object. The trust zone can include graphical markers, coloring, labels, arrows, or the like. In some examples, the trust zone is rendered on a display screen, projected on a windshield, or displayed in a HUD. The trajectories around the object can include paths in which the vehicle 106 intends to navigate. It is further noted that trajectories of objects can be displayed. Moreover, the vehicle 106 may be operated along the trajectory, such as in an autonomous mode where the vehicle 106 controls steering, acceleration, braking, or other driving functions.

At block 410, the vehicle 106 can determine whether to adjust or modify a trust level based on historical data. The trust level can be a trust parameter based on a user's historical actions, settings, or reactions to divining in traffic conditions. The trust level may be modified based on the vehicle 106 analyzing feedback data collected in response to navigation, information provided by the user through an interface, or the like.

In examples, the trust parameter can include a trust level denoted as a high level of trust, an intermediary level of trust, and a low level of trust. The trust level may be increased or decreased based on feedback data. In some examples, the vehicle 106 may apply artificial intelligence, statistical models, or other processes and/or algorithms to determine or adjust trust levels for a given scenario (e.g., determine factors to modify a trust level, etc.). For instance, the vehicle 106 may calculate trust levels by applying a weighted model. The weighted model may weigh or balance various relationally applied factors, where weighting and balancing may vary in accordance with machine learning over time.

Accordingly, described embodiments include systems and methods for displaying trajectories around objects according to a trust setting for autonomous vehicles. The vehicles can be configured to determine trust parameters associate with a user's trust level of an autonomous vehicle in a given traffic situation. Moreover, vehicles can select a trust zone in which to maneuver relative an object, and trajectories based on the trust zone. Vehicles can display the trajectories, trust zones, or other information via a display of the vehicle. User's trust level in autonomous vehicles can be increased.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle, comprising:
   a computing device configured to:
   detect an object in an external environment via at least one external sensor,
   determine a trajectory for navigation relative the object based on a trust zone selected from a plurality of trust zones, wherein the trust zone is selected based on a trust parameter, the trust parameter including a trust level that is determined based on a plurality of environmental conditions, the plurality of environmental conditions including a vehicle condition, vehicle network connectivity information, a type of roadway, a classification corresponding to a type of vehicle, and a type of artificial light information of the external environment;
   instruct a display device to render a representation of the object, the plurality of trust zones, and the trajectory relative the object; and
   determine whether to modify the trust parameter based on feedback data received in response to navigation, wherein
   the trust parameter is modified based on feedback collected during navigation through the trajectory from at least one internal sensor that includes a pressure sensor configured to measure pressure on a steering wheel of the vehicle,
   the feedback data reflects a lack of trustworthiness by the user during navigation in the trust zone,
   the lack of trustworthiness is indicated during the navigation through the trajectory in response to the pressure sensor indicating that the pressure is applied during the navigation, and
   the computing device is configured to control the vehicle to autonomously navigate in accordance with the trajectory.

2. The vehicle of claim 1, wherein the computing device is further configured to modify the trust parameter based on feedback collected from a biometric sensor configured to measure biometric information associated with a user.

3. The vehicle of claim 1, wherein the computing device is further configured to lower the trust parameter based on the feedback data indicating that a user manually controlled the vehicle during the navigation.

4. The vehicle of claim 1, wherein the trust parameter includes at least a high level of trust and a low level of trust, and wherein the computing device selects the trust zone to be closer to the object when the trust parameter comprises the high level of trust and selects the trust zone to be further from the object when the trust parameter comprises the low level of trust.

5. The vehicle of claim 1, wherein the display device comprises an augmented reality display device.

6. The vehicle of claim 5, wherein the augmented reality display device comprises a three-dimensional heads-up display device.

7. A method implemented by a vehicle, the method comprising:
   analyzing external sensor data to identify an object;
   determining a trajectory for navigation relative to the object based on a trust zone, wherein the trust zone is selected based on a trust parameter, the trust parameter including a trust level that is determined based on a plurality of environmental conditions, the plurality of environmental conditions including a vehicle condition, vehicle network connectivity information, a type of roadway, a classification corresponding to a type of vehicle, and a type of artificial light information of the external environment;
   displaying a representation of the object, the plurality of trust zones, and the trajectory relative the object; and
   determining whether to modify the trust parameter based on feedback collected in response to navigation, wherein
   the trust parameter is modified based on feedback collected during navigation through the trajectory from at least one internal sensor that includes a pressure sensor configured to measure pressure on a steering wheel of the vehicle,
   the feedback data reflects a lack of trustworthiness by the user during navigation in the trust zone,
   the lack of trustworthiness is indicated during the navigation through the trajectory in response to the pressure sensor indicating that the pressure is applied during the navigation, and
   controlling the vehicle to autonomously navigate in accordance with the trajectory.

8. The method of claim 7, wherein the trust parameter includes at least a high level of trust and a low level of trust, and further comprising selecting the trust zone to be closer to the object when the trust parameter comprises the high level of trust and selects the trust zone to be further from the object when the trust parameter comprises the low level of trust.

9. The method of claim 7, further comprising analyzing the feedback according to a model that is trained to identify trust levels in navigation of the vehicle.

10. The method of claim 7, wherein analyzing external sensor data to identify the object further comprises determining at least one of a type of the object, a condition of the object, or a distance of the object relative the vehicle.

11. The method of claim 10, further comprising displaying at least one of the type of the object, the condition of the object, or the distance of the object relative the vehicle on a display device.

12. A vehicle navigation system comprising:
    an electronic control unit configured to:
    detect objects in an external environment via at least one external sensor,
    determine a trajectory for navigation relative the object based on a trust zone selected from a plurality of trust zones, wherein the trust zone is selected based on a trust parameter stored in a computer readable memory, the trust parameter including a trust level that is determined based on a plurality of environmental conditions, the plurality of environmental conditions including a vehicle condition, vehicle network connectivity information, a type of roadway, a classification corresponding to a type of vehicle, and a type of artificial light information of the external environment;

instruct a display device to render a representation of the object, the plurality of trust zones, and the trajectory relative to the object; and modify the trust parameter in response to comparison of feedback data to a trust model, wherein the trust parameter is modified based on feedback collected during navigation through the trajectory from at least one internal sensor that includes a pressure sensor configured to measure pressure on a steering wheel of the vehicle, the feedback data reflects a lack of trustworthiness by the user during navigation in the trust zone, the lack of trustworthiness is indicated during the navigation through the trajectory in response to the pressure sensor indicating that the pressure is applied during the navigation, and the electronic control unit is configured to control the vehicle to autonomously navigate in accordance with the trajectory.

13. The vehicle navigation system of claim 12, wherein the electronic control unit modifies the trust parameter by increasing a trust level when the feedback data indicates a user has increased trust according to the trust model, and modifies the trust parameter by decreasing the trust level when the feedback data indicates the user has decreased trust according to the trust model.

* * * * *